(12) United States Patent
Morikawa et al.

(10) Patent No.: US 10,336,908 B2
(45) Date of Patent: Jul. 2, 2019

(54) THREE-DIMENSION FORMING SUPPORT MATERIAL, THREE-DIMENSION FORMING SUPPORT MATERIAL CARTRIDGE, AND THREE-DIMENSION FORMING COMPOSITION SET

(71) Applicant: FUJI XEROX CO., LTD., Tokyo (JP)

(72) Inventors: Takashi Morikawa, Kanagawa (JP); Takashi Oyanagi, Kanagawa (JP); Naoki Hiji, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 128 days.

(21) Appl. No.: 15/222,618

(22) Filed: Jul. 28, 2016

(65) Prior Publication Data
US 2017/0240751 A1    Aug. 24, 2017

(30) Foreign Application Priority Data
Feb. 22, 2016 (JP) .................. 2016-031040

(51) Int. Cl.
| | |
|---|---|
| *C09D 7/65* | (2018.01) |
| *C09D 4/00* | (2006.01) |
| *C09D 5/00* | (2006.01) |
| *C09D 11/101* | (2014.01) |
| *C09D 11/102* | (2014.01) |
| *C09D 11/34* | (2014.01) |
| *B33Y 70/00* | (2015.01) |
| *B29C 64/40* | (2017.01) |

(52) U.S. Cl.
CPC ............... *C09D 7/65* (2018.01); *B33Y 70/00* (2014.12); *C09D 4/00* (2013.01); *C09D 5/00* (2013.01); *C09D 11/101* (2013.01); *C09D 11/102* (2013.01); *C09D 11/34* (2013.01); *B29C 64/40* (2017.08)

(58) Field of Classification Search
CPC . C09D 7/125; C09D 4/00; C09D 5/00; C09D 11/101; C09D 11/102; C09D 11/34; B33Y 70/00
USPC ......................................... 524/757
See application file for complete search history.

(56) References Cited

U.S. PATENT DOCUMENTS

| | | | | |
|---|---|---|---|---|
| 4,880,888 A * | 11/1989 | Obayashi | ............... | C08F 20/04 525/383 |
| 4,973,632 A * | 11/1990 | Nagasuna | ................. | C08F 2/32 526/200 |
| 2002/0059884 A1* | 5/2002 | Ryu | ..................... | C09D 11/38 106/31.46 |
| 2013/0234370 A1* | 9/2013 | Suzuki | ................. | C08F 220/10 264/401 |

FOREIGN PATENT DOCUMENTS

| | | |
|---|---|---|
| CN | 103189187 A | 7/2013 |
| CN | 104893224 A | 9/2015 |

(Continued)

*Primary Examiner* — Kelechi C Egwim
(74) *Attorney, Agent, or Firm* — Oliff PLC (57) ABSTRACT

A three-dimension forming support material for ink jet includes a warm water-soluble radiation curable compound that exhibits solubility in warm water of at least 40° C. to 90° C. after the compound is cured; and at least one polyglycerin compound selected from the group consisting of fatty acid esters of polyglycerin, ethylene oxide adducts of polyglycerin, and propylene oxide adducts of polyglycerin.

19 Claims, 3 Drawing Sheets

(56) References Cited

FOREIGN PATENT DOCUMENTS

| JP | H08-300490 A | 11/1996 |
|----|--------------|---------|
| JP | 2000-309057 A | 11/2000 |
| JP | 2012-111226 A | 6/2012 |

* cited by examiner

THREE-DIMENSION FORMING SUPPORT MATERIAL, THREE-DIMENSION FORMING SUPPORT MATERIAL CARTRIDGE, AND THREE-DIMENSION FORMING COMPOSITION SET

CROSS-REFERENCE TO RELATED APPLICATIONS

This application is based on and claims priority under 35 USC 119 from Japanese Patent Application No. 2016-031040 filed Feb. 22, 2016.

BACKGROUND

1. Technical Field

The present invention relates to a three-dimension forming support material, a three-dimension forming support material cartridge, and a three-dimension forming composition set.

2. Related Art

The three-dimension forming apparatus, also called as a 3D printer, for example, is known as an apparatus for fabricating a three-dimensional structure (for example, parts of industrial products, toys such as dolls, and the like) in which the three-dimensional structure is fabricated by repeating the following processes of: disposing a forming material (model material) using an ink jet method according to the cross-sectional shape data of a three-dimensional shape, and curing the material with radiation such as an ultraviolet ray (UV) or an electron beam (EB).

In the three-dimension forming apparatus, in order to form a freely-shaped structure, in the case of forming an overhang or ceiling, a support material for forming a support portion supporting the lower portion of the forming material is required.

SUMMARY

According to an aspect of the invention, there is provided a three-dimension forming support material for ink jet including:

a warm water-soluble radiation curable compound that exhibits solubility in warm water of at least 40° C. to 90° C. after the compound is cured; and at least one polyglycerin compound selected from the group consisting of fatty acid esters of polyglycerin, ethylene oxide adducts of polyglycerin, and propylene oxide adducts of polyglycerin.

BRIEF DESCRIPTION OF THE DRAWINGS

Exemplary embodiments of the present invention will be described in detail based on the following figures, wherein.

DETAILED DESCRIPTION

Hereinafter, exemplary embodiments, which are one example of the present invention, will be described in detail.

<Three-Dimension Forming Support Material>

The three-dimension forming support material (hereinafter, also referred to as a "support material") according to an exemplary embodiment of the invention is a support material for inkjet which is discharged by an inkjet method.

And, the support material contains a warm water-soluble radiation curable compound, and at least one polyglycerin compound selected from the group consisting of fatty acid esters of polyglycerin, ethylene oxide adducts of polyglycerin, and propylene oxide adducts of polyglycerin.

Here, the "warm water-soluble" means that a compound cured by radiation irradiation exhibits solubility in warm water of at least 40° C. to 90° C. In addition, solubility means that when the cured compound is immersed in warm water of the temperature range, the compound is dissolved to exhibit flowability, and is in a state of being unable to maintain the shape at the time of being cured.

Further, in the present specification, the warm water refers to water within the above temperature range.

According to the exemplary embodiment of the invention, since the support material satisfies the above configuration, a support material which may form a three-dimensional structure with excellent shape accuracy is provided.

An estimated mechanism in which this effect is exerted is inferred as follows.

Conventionally, a three-dimensional structure has been formed using a radiation curable three-dimension forming material (hereinafter, also referred to as a "model material") and a three-dimension forming support material (support material) by ink jet type discharging apparatus. For example, the three-dimensional structure may be obtained by discharging the model material by ink jet, curing the model material by radiation irradiation to form a structure, discharging the support material by ink jet, curing the support material by radiation irradiation to form a support portion, forming the structure in a desired shape, and then removing the support portion.

Here, the support material for ink jet is required to have a viscosity sufficient to be discharged from a discharge device at a temperature at the time of the discharge by the discharge device (typically a temperature of 45° C. to 85° C.). However, on the other hand, from the viewpoint of accurately forming a support portion which is formed by the support material into a desired shape, it is required to prevent the movement of the support material from the discharged position until the support material is cured by radiation irradiation after being discharged from the discharge device.

In this regard, the support material for ink jet according to the exemplary embodiment includes a polyglycerin compound selected from the above group. Therefore, even though the support material has a fluidity of low viscosity sufficient to be discharged from the discharge device at a temperature at the time of discharge, the temperature of the support material is lowered after being discharged, so that the viscosity is increased. Thus, the flowability is reduced. Accordingly, the flow from the discharged position is reduced, and the movement of the support material until being cured by radiation is prevented, so that the support portion with excellent shape accuracy is formed. As a result, since the support portion has excellent shape accuracy, the three-dimensional structure formed by using a support material of the exemplary embodiment of the present invention with the model material exhibits excellent shape accuracy.

Further, the support material according to the exemplary embodiment including a radiation curable compound and the polyglycerin compound selected from the above group exhibits excellent curability by radiation irradiation. In addition, since the melting temperature increases after being cured by radiation irradiation than prior to being cured by radiation irradiation, and since the next support portion is formed by further lamination on the cured support portion, even when the support material is further discharged and landed after being cured, the deformation in heat by the support material discharged later is less likely to occur. Therefore, a support portion with excellent shape accuracy is also formed in this regard.

Further, the support material is required to have a removal property after prepared as a support portion, that is, after being cured. In this regard, in the exemplary embodiment, a warm water-soluble radiation curable compound and a polyglycerin compound selected from the above group are included. Since the radiation curable compound exhibits solubility in warm water and the polyglycerin compound is also soluble in the warm water, the support portion may be dissolved and easily removed by using warm water during the removal of the support portion.

Hereinafter, components of the support material according to the exemplary embodiment will be described in detail.

The support material according to the exemplary embodiment contains a warm water-soluble radiation curable compound and a polyglycerin compound. The support material may contain other additives such as a plasticizer, a radiation polymerization initiator, a polymerization inhibitor, a surfactant, a coloring material, and the like, in addition to the components described above.

(Warm Water-Soluble Radiation Curable Compound)

The radiation curable compound is a compound which is cured (polymerized) by radiation (for example, an ultraviolet ray or an electron beam). The radiation curable compound may be a monomer or an oligomer.

Further, "warm water-soluble" means that the compound cured by radiation irradiation exhibits solubility in warm water within the above-mentioned temperature range.

Examples of the radiation curable compound include compounds having a radiation curable functional group (a radiation polymerizable functional group). Examples of the radiation curable functional group include an ethylenically unsaturated double bond (for example, a N-vinyl group, a vinyl ether group, a (meth)acryloyl group, or the like), an epoxy group, and an oxetanyl group. As the radiation curable compound, a compound having an ethylenically unsaturated bond group (preferably an acryloyl group) is preferable.

Examples of the warm water-soluble radiation curable compound include hydroxyethyl (meth)acrylate ($CH_2$=C(—R)—C(=O)—$OCH_2CH_2OH$/R: hydrogen or a methyl group), (meth)acrylamide ($CH_2$=C(—R)—C(=O)—$NH_2$/R: hydrogen or a methyl group), hydroxyethyl (meth)acrylamide ($CH_2$=C(—R)—C(=O)—NH—$CH_2CH_2OH$/R: hydrogen or a methyl group), (meth)acryloyl morpholine, acrylic acid ($CH_2$=CH—C(=O)—OH), methoxy triethylene glycol acrylate, methoxy polyethylene glycol acrylate, methoxy polyoxyethylene glycol acrylate, and the like.

Among the above, from the viewpoint of lowering the viscosity of the compound at a temperature at the time of discharge to improve the discharge property in an ink jet method, from the viewpoint of satisfactorily curing by radiation irradiation, and from the viewpoint of improving removal property at the time of removal with warm water after being cured, hydroxyethyl (meth) acrylate, (meth) acrylamide, (meth)acryloyl morpholine, acrylic acid, methoxy triethylene glycol acrylate, and methoxy polyethylene glycol acrylate are preferable, and hydroxyethyl (meth)acrylate is more preferable.

In addition, in the present specification, (meth) acrylate means both acrylate and methacrylate. Further, (meth)acryloyl means both an acryloyl group and a methacryloyl group.

Viscosity of Radiation Curable Compound

The viscosity (23° C.) of the radiation curable compound is preferably from 5 mPa·s to 80 mPa·s, more preferably from 8 mPa·s to 60 mPa·s, even more preferably from 10 mPa·s to 50 mPa·s.

In addition, the viscosity is measured according to a measurement method using RHEOMAT 115 (manufactured by Contraves Co.) to be described later.

Content of Radiation Curable Compound

The content of the radiation curable compound is preferably from 40% by weight to 80% by weight and more preferably from 45% by weight to 65% by weight with respect to a total amount of the support material.

(Polyglycerin Compound)

The support material according to the exemplary embodiment includes at least one polyglycerin compound selected from the group consisting of fatty acid esters of polyglycerin, ethylene oxide adducts of polyglycerin, and propylene oxide adducts of polyglycerin.

The polyglycerin in fatty acid esters of polyglycerin is preferably one in which 2 molecules to 20 molecules of glycerin are polymerized, and examples thereof include diglycerin, triglycerin, tetraglycerin, pentaglycerin, hexaglycerin, heptaglycerin, octaglycerin, nonaglycerin, decaglycerin, undecaglycerin, and dodecaglycerin. Tetraglycerin, hexaglycerin, or decaglycerin is preferable.

The fatty acid is preferably a fatty acid having 16 to 20 carbon atoms, and for example, a saturated fatty acid such as palmitic acid, stearic acid, or arachidic acid is preferable.

As the polyglycerin in ethylene oxide adducts of polyglycerin and propylene oxide adducts of polyglycerin, polyglycerin in fatty acid esters of polyglycerin listed above is preferable.

The ethylene oxide or propylene oxide is preferably added in 60 mol to 120 mol, and more preferably added in 80 mol to 100 mol.

The polyglycerin compound may be used singly, or two or more kinds thereof may be used in combination.

Examples of using two or more polyglycerin compounds in combination include mixtures of fatty acid esters of polyglycerin and ethylene oxide adducts of polyglycerin or propylene oxide adducts of polyglycerin, and the like. Specific examples thereof include a mixture of stearate esters of polyglycerin (for example, stearate esters of decaglycerin) and ethylene oxide adducts of polyglycerin (for example, ethylene oxide adducts of diglycerin), and the like.

In the case of using (a) the fatty acid esters of polyglycerin and (b) ethylene oxide adducts of polyglycerin or propylene oxide adducts of polyglycerin, the weight ratio (a:b) thereof is preferably in a range of 70:30 to 90:10, and more preferably in a range of 75:25 to 85:15.

The hydrophile lipophile Balance (HLB) value of the polyglycerin compound contained in the three-dimension forming support material is preferably 7 to 13, and more preferably 8 to 12.

The hydrophile lipophile Balance (HLB) value of the polyglycerin compounds (in the case of using two or more polyglycerin compounds, the HLB value of the mixture) is preferably 7 to 13, and more preferably 8 to 12. If the HLB value is 7 or more, the solubility in warm water is further improved. Meanwhile, if the HLB value is less than 13, the performance increasing the viscosity of the support material after being discharged from the discharging unit is further enhanced. As a result, the shape accuracy of the support portion becomes excellent.

Viscosity of Polyglycerin Compound

The polyglycerin compound is preferably solid at ambient temperature (23° C.).

The temperature at the time of discharging support material by an ink jet type discharging apparatus is, for example, 70° C., and the viscosity of the polyglycerin compound at this temperature is, for example, preferably from 200 mPa·s to 1,500 mPa·s, more preferably from 400 mPa·s to 1,200 mPa·s, even more preferably from 600 mPa·s to 1,000 mPa·s.

In addition, the viscosity is measured according to a measurement method using RHEOMAT 115 (manufactured by Contraves Co.) to be described later.

The melting temperature of the polyglycerin compound is preferably from 40° C. to 70° C.

Content of Polyglycerin Compound

The content of polyglycerin compound (the total amount in the case of using two or more kinds of polyglycerin compounds in combination) is preferably from 5% by weight to 45% by weight, more preferably from 10% by weight to 35% by weight and even more preferably from 15% by weight to 30% by weight with respect to a total amount of the support material.

(Plasticizer)

The support material according to the exemplary embodiment may further include a plasticizer.

Examples of the plasticizer include a non-radiation curable component such as a non-radiation curable polymer. The non-radiation curable polymer refers to a polymer in which a curing (polymerization) reaction does not occur by radiation (for example, an ultraviolet ray or an electron beam).

The weight average molecular weight of the non-radiation curable component is preferably from 200 to 1,000, and more preferably from 250 to 850. The viscosity (25° C.) of the non-radiation curable component is preferably 200 mPa·s or less, more preferably 100 mPa·s or less, and even more preferably 70 mPa·s or less.

As the non-radiation curable polymer, at least one type selected from the group consisting of polyether polyol, castor oil polyol, and polyester polyol is preferable.

Polyether Polyol

Examples of the polyether polyol include multimers of polyols, adducts of polyols and alkylene oxide, and a ring-opening polymer of alkylene oxide.

Examples of the polyol include ethylene glycol, diethylene glycol, propylene glycol, dipropylene glycol, 1,4-butanediol, 1,3-butanediol, neopentyl glycol, 1,6-hexanediol, 1,2-hexanediol, 3-methyl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, octadecanediol, glycerin, trimethylolpropane, pentaerythritol, and hexanetriol.

Examples of the alkylene oxide include ethylene oxide, propylene oxide, butylene oxide, styrene oxide, epichlorohydrin, and tetrahydrofuran.

Castor Oil Polyol

Examples of the castor oil polyol include a modified castor oil in which a castor oil is modified with a polyol and a modified castor oil fatty acid in which a castor oil fatty acid (a fatty acid obtained from the castor oil) is modified with a polyol.

Examples of the polyol include polyols exemplified in the description of the polyether polyol.

In addition, the hydroxyl value of the castor oil polyol is preferably from 100 mgKOH/g to 300 mgKOH/g and more preferably from 130 mgKOH/g to 200 mgKOH/g.

Polyester Polyol

Examples of the polyester polyol include reaction products of a polyol and a dibasic acid and a ring-opening polymer of a cyclic ester compound.

Examples of the polyol include polyols exemplified in the description of the polyether polyol.

Examples of the dibasic acid include a carboxylic acid (for example, succinic acid, adipic acid, sebacic acid, a dimer acid, maleic acid, phthalic acid, isophthalic acid and terephthalic acid) and anhydrides of the carboxylic acid.

Examples of the cyclic ester compound include ε-caprolactone and β-methyl-δ-valerolactone.

Here, as the non-radiation curable polymer, the various polyols described above and the polyol may be used in combination. In particular, the polyol is preferably used in combination with the polyester polyol. That is, as the non-radiation curable polymer, a mixture of the polyester polyol and the polyol may be exemplified.

The content of the polyol to be used in combination with the various polyols described above is preferably from 30% by weight to 60% by weight (more preferably from 35% by weight to 50% by weight) with respect to a total amount of the radiation curable polymers. In particular, in a case where the mixture of the polyester polyol and the polyol is used, the weight ratio (polyester polyol/polyol) is preferably from 30/70 to 10/90 (more preferably from 25/75 to 20/80).

In addition, examples of the polyol include polyols exemplified in the description of polyether polyol.

The non-radiation curable polymer is preferably composed of a fatty acid ester having carbon atoms of 16 to 20.

Weight Average Molecular Weight of Non-Radiation Curable Polymer

The weight average molecular weight of the non-radiation curable polymer is preferably from 200 to 1,000, and more preferably from 250 to 850.

The weight average molecular weight of the non-radiation curable polymer is a value measured by gel permeation chromatography (GPC) using polystyrene as a reference substance.

Viscosity of Non-Radiation Curable Polymer

The viscosity (25° C.) of the non-radiation curable polymer is preferably 200 mPa·s or less, more preferably 100 mPa·s or less, and even more preferably 70 mPa·s or less.

In addition, the viscosity may be measured according to a measurement method using RHEOMAT 115 (manufactured by Contraves Co.) to be described later.

Content of Plasticizer

The content of the plasticizer is, for example, preferably from 25% by weight to 60% by weight, more preferably from 30% by weight to 55% by weight and even more preferably from 35% by weight to 50% by weight with respect to a total amount of the support material.

In addition, the plasticizer may be used singly, or two or more kinds thereof may be used in combination.

(Radiation Polymerization Initiator)

Examples of the radiation polymerization initiator include well-known polymerization initiators such as a radiation radical polymerization initiator and a radiation cationic polymerization initiator.

Examples of the radiation radical polymerization initiator include aromatic ketones, an acyl phosphine oxide compound, an aromatic onium salt compound, organic peroxides, a thio-compound (a thioxanthone compound, a compound containing a thiophenyl group, or the like), a hexaaryl biimidazole compound, a keto-oxime ester compound, a borate compound, an azinium compound, a metallocene compound, an active ester compound, a compound having a carbon-halogen bond, and an alkylamine compound.

Specific examples of the radiation radical polymerization initiator include well-known radiation polymerization initiators such as acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholino-propan-1-one, bis(2,4,6-trimethylbenzoyl)-phenyl phosphine oxide, 2,4,6-trimethylbenzoyl-diphenyl-phosphine oxide, 2,4-diethylthioxanthone, and bis-(2,6-dimethoxybenzoyl)-2,4,4-trimethyl pentyl phosphine oxide.

Content of Radiation Polymerization Initiator

The content of the radiation polymerization initiator is for example, preferably from 1% by weight to 10% by weight and more preferably from 3% by weight to 5% by weight with respect to the radiation curable compound.

In addition, the radiation polymerization initiator may be used singly, or two or more kinds thereof may be used in combination.

(Polymerization Inhibitor)

Examples of the polymerization inhibitor include well-known polymerization inhibitors such as a phenolic polymerization inhibitor (for example, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-t-butylphenol), 4,4'-thiobis(3-methyl-6-t-butylphenol), or the like), hindered amine, hydroquinone monomethyl ether (MEHQ), and hydroquinone.

Content of Polymerization Inhibitor

The content of the polymerization inhibitor is for example, preferably from 0.1% by weight to 1% by weight and more preferably from 0.3% by weight to 0.5% by weight with respect to a total amount of the radiation curable compound.

In addition, the polymerization inhibitor may be used singly, or two or more kinds thereof may be used in combination.

(Surfactant)

Examples of the surfactant include, for example, well-known surfactants such as a silicone surfactant, an acrylic surfactant, a cationic surfactant, an anionic surfactant, a nonionic surfactant, an amphoteric surfactant, and a fluorine surfactant, and the like.

Content of Surfactant

The content of the surfactant is, for example, preferably from 0.05% by weight to 0.5% by weight and more preferably from 0.1% by weight to 0.3% by weight with respect to a total amount of the radiation curable compound.

In addition, the surfactant may be used singly, or two or more kinds thereof may be used in combination.

(Other Additives)

In addition to the above, examples of the other additives include well-known additives such as a coloring material, a solvent, a sensitizer, a fixing agent, an antifungal agent, a preservative, an antioxidant, an ultraviolet ray absorbent, a chelating agent, a thickening agent, a dispersant, a polymerization promoter, a permeation promoter, and a humectant (moisturizing agent), and the like.

(Properties of Support Material)

The surface tension of the support material is, for example, in a range from 20 mN/m to 40 mN/m.

Here, the surface tension is a measured value using a Wilhelmy type surface tensiometer (manufactured by Kyowa Interface Science Co., LTD.), in an environment of 23° C. and 55% RH.

The viscosity (23° C.) of the support material is, for example, in a range from 30 mPa·s to 50 mPa·s.

In addition, the temperature at the time of discharging the support material by an ink jet type discharging apparatus is, for example, 70° C., and the viscosity of the support material at this temperature is, for example, preferably from 5 mPa·s to 20 mPa·s, more preferably 8 mPa·s to 18 mPa·s, and even more preferably 10 mPa·s to 15 mPa·s.

Here, the viscosity is a measured value using RHEOMAT 115 (manufactured by Contraves Co.) as a measuring apparatus, under the conditions that each measuring temperature is set to the above temperature and a shear rate is $1,400\ s^{-1}$.

<Three-Dimension Forming Composition Set>

A three-dimension forming composition set according to the exemplary embodiment has a radiation curable model material (three-dimension forming material) and a support material (three-dimension forming support material) according to the above-mentioned exemplary embodiment.

[Model Material]

The model material to be used in a three-dimension forming composition set according to the exemplary embodiment contains a radiation curable compound (radiation curable compound for the model material). The model material may contain other additives such as a radiation polymerization initiator, a polymerization inhibitor, a surfactant, a coloring material, and the like, in addition to the components described above.

Examples of the radiation curable compound (radiation curable compound for the model material) to be used in the model material include compounds having a radiation curable functional group (a radiation polymerizable functional group). Examples of the radiation curable functional group include an ethylenically unsaturated double bond (for example, a N-vinyl group, a vinyl ether group, a (meth) acryloyl group, or the like), an epoxy group, and an oxetanyl group. As the radiation curable compound, a compound having an ethylenically unsaturated bond group (more preferably a (meth)acryloyl group) is preferable.

Specifically, examples of the radiation curable compound for the model material preferably include urethane (meth) acrylate, epoxy (meth)acrylate, and polyester (meth)acrylate. Among the above, as the radiation curable compound for the model material, urethane (meth)acrylate is preferable.

The content of the radiation curable compound for the model material is preferably from 90% by weight to 99% by weight and more preferably from 93% by weight to 97% by weight with respect to a total amount of the model material.

In particular, the radiation curable compound for the model material is preferably used in combination with urethane (meth)acrylate and the other radiation curable compounds (for example, monofunctional or multifunctional (meth)acrylate). In this case, the content of the urethane (meth)acrylate is preferably from 10% by weight to 60% by weight and more preferably from 20% by weight to 50% by weight with respect to a total amount of the model material. Meanwhile, the content of the other radiation curable compounds is preferably from 40% by weight to 75% by weight and more preferably from 50% by weight to 65% by weight with respect to a total amount of the support material.

In addition, the radiation curable compound for the model material may be used singly, or two or more kinds thereof may be used in combination.

Further, as the radiation polymerization initiator, the polymerization inhibitor, the surfactant, and the coloring material to be used in the model material, the components exemplified for the support material may be used. In addition, the properties of the model material are in the same range as the properties of the support material.

<Three-Dimension Forming Apparatus/Method of Preparing Three-Dimensional Structure>

A three-dimension forming apparatus according to the exemplary embodiment includes a first discharge unit accommodating the radiation curable model material (three-dimension forming material) and discharging the model material in the ink jet method, a second discharge unit accommodating the support material (three-dimension forming support material) according to the exemplary embodiment and discharging the support material in the ink jet method, and a radiation irradiation unit which perform radiation irradiation to cure the discharged model material and the discharged support material.

In the three-dimension forming apparatus according to the exemplary embodiment, a method of preparing a three-dimensional structure (the method of preparing a three-dimensional structure according to the exemplary embodiment) including: discharging the radiation curable model material (three-dimension forming material) in an ink jet method and curing the model material by radiation irradiation to form a structure; and discharging the support material (three-dimension forming support material) according to the exemplary embodiment in an ink jet method and curing the support material by radiation irradiation to form a support portion for supporting at least a part of the structure, is executed. In addition, in the method of preparing a three-dimensional structure according to the exemplary embodiment, the three-dimensional structure is prepared, after forming a structure, by dissolving the support portion in the warm water of 40° C. to 90° C. (preferably 60° C. to 90° C. and more preferably 60° C. to 80° C.) and then removing the support portion.

In addition, the three-dimension forming apparatus according to the exemplary embodiment may include a model material cartridge (three-dimension forming material cartridge), which is configured as a cartridge so as to accommodate the model material and be detachable from the three-dimension forming apparatus. In addition, in the same manner, the three-dimension forming apparatus may include a support material cartridge (three-dimension forming support material cartridge), which is configured as a cartridge so as to accommodate the support material and be detachable from the three-dimension forming apparatus.

Hereinafter, the three-dimension forming apparatus according to the exemplary embodiment will be described with reference to the drawings.

Figure 1:
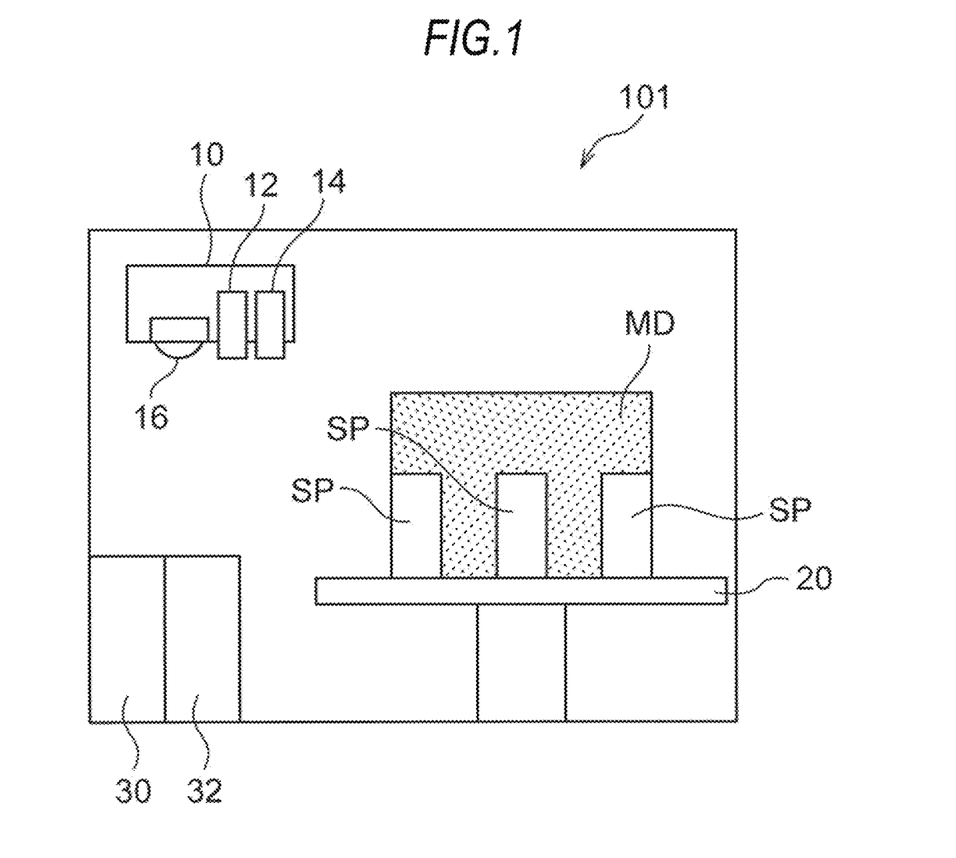
FIG. 1 is a configuration diagram schematically illustrating one example of a three-dimension forming apparatus according to an exemplary embodiment of the invention.

FIG. 1 is a configuration view schematically illustrating one example of a three-dimension forming apparatus according to the exemplary embodiment.

A three-dimension forming apparatus 101 according to the exemplary embodiment is an inkjet type three-dimension forming apparatus. As illustrated in FIG. 1, the three-dimension forming apparatus 101 includes, for example, a forming unit 10 and a forming board 20. In addition, the three-dimension forming apparatus 101 includes a model material cartridge 30 having the model material accommodated therein and a support material cartridge 32 having the support material accommodated therein such that the cartridges are detachable from the apparatus. In addition, in FIG. 1, MD indicates a structure and SP indicates a support portion.

The forming unit 10 includes, for example, a model material discharge head 12 (one example of the first discharge unit) for discharging a droplet of the model material in an ink jet method, a support material discharge head 14 (one example of the second discharge unit) for discharging a droplet of the support material in an ink jet method, and a radiation irradiation device 16 (radiation irradiation device) applying radiation. In addition to the above, the forming unit 10 may include, for example, a rotation roller (not illustrated) for removing excess model material and the support material in the model material and the support material discharged on the forming board 20 and flattening the materials.

The forming unit 10 is configured, for example, to be movable over a forming region of the forming board 20 by a driving unit (not illustrated) in a main scanning direction and in a sub-scanning direction intersecting with (for example, perpendicular to) the main scanning direction (so-called a carriage type).

As for each of the model material discharge head 12 and the support material discharge head 14, a piezo type (piezoelectric type) discharge head for discharging droplets of each material by pressure is adopted. Each of the discharge heads is not limited thereto as long as the heads are ink jet methods, and the head may be a discharge head for discharging each material by pressure from a pump.

The model material discharge head 12 is, for example, connected to the model material cartridge 30 through a supply line (not illustrated). In addition, the model material is supplied to the model material discharge head 12 from the model material cartridge 30.

The support material discharge head 14 is, for example, connected to the support material cartridge 32 through a supply line (not illustrated). In addition, the support material is supplied to the support material discharge head 14 from the support material cartridge 32.

Each of the model material discharge head 12 and the support material discharge head 14 is a short-length discharge head configured to have an effective discharge region (arrangement region of the nozzles discharging the model material and the support material) smaller than the forming region of the forming board 20.

In addition, each of the model material discharge head 12 and the support material discharge head 14 may be an elongated head, for example, configured to have an effective discharge region (arrangement region of the nozzles discharging the model material and the support material) larger than the width of the forming region (length in a direction intersecting with (for example, perpendicular to) the moving direction (main scanning direction) of the forming unit 10) on the forming board 20. In this case, the forming unit 10 is configured to move only in the main scanning direction.

Further, at the time of discharging the support material from the support material discharge head 14, the support material is heated to from 40° C. to 90° C. (preferably from 45° C. to 80° C., and more preferably from 50° C. to 75° C.)

In addition, at the time of discharging the model material from the model material discharge head 12, the temperature at which the model material is heated is preferably the same range as described above The radiation irradiation device 16 is selected depending on the type of the model material and the support material. Examples of the radiation irradiation device 16 include an ultraviolet ray irradiation device and an electron beam irradiation device.

Here, examples of the ultraviolet ray irradiation device include devices having a light source, such as a metal halide lamp, a high pressure mercury lamp, an ultrahigh pressure mercury lamp, a deep ultraviolet ray lamp, a lamp to excite a mercury lamp without electrodes from the outside using microwaves, an ultraviolet ray laser, a xenon lamp, and UV-LED.

Examples of the electron beam irradiation device include a scanning type electron beam irradiation device, a curtain type electron beam irradiation device, and a plasma discharge type electron beam irradiation device.

The forming board 20 has a surface having a forming region where a structure is formed by the model material and the support material being discharged. In addition, the forming board 20 is configured to be freely lifted by the driving unit (not illustrated).

Next, an operation of the three-dimension forming apparatus 101 according to the exemplary embodiment (method of preparing a three-dimensional structure) will be described.

First, through a computer (not illustrated), as data for three-dimension formation, for example, two-dimensional shape data (slice data) for forming a structure are created from, for example, three-dimensional Computer Aided Design (CAD) data of the three-dimensional structure formed by the model material. At this time, the two-dimensional shape data (slice data) for forming a support portion using the support material is also created. The two-dimensional shape data for forming a support portion is configured such that, in a case where the width of an upper structure is greater than the width of a lower structure, in other words, when there is an overhanging portion, the support portion is formed to support the overhanging portion from below.

Next, based on the two-dimensional shape data for forming a structure, the model material is discharged from the model material discharge head 12 while moving the forming unit 10, so as to forma layer of the model material on the forming board 20. Then, the layer of the model material is irradiated with radiation by the radiation irradiation device 16 to cure the model material, thereby forming a layer to be a part of the structure.

If necessary, based on the two-dimensional shape data for forming a support portion, the support material is discharged from the support material discharge head 14 while moving the forming unit 10, so as to forma layer of the support material adjacent to the layer of the model material on the forming board 20. Then, the layer of the support material is irradiated with radiation by the radiation irradiation device 16 to cure the support material, thereby forming a layer to be a part of the support portion.

Figure 2A:
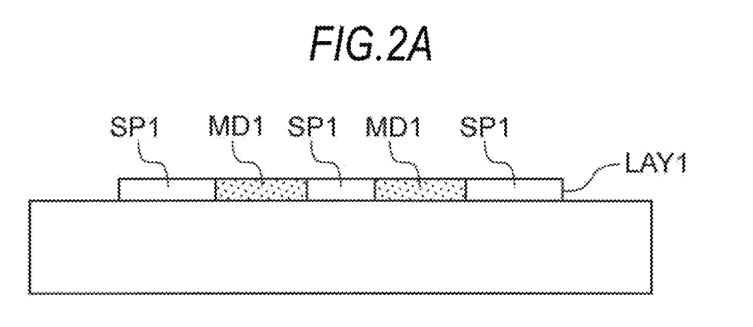
FIG. 2A is a process diagram illustrating one example of a method of preparing a three-dimensional structure according to an exemplary embodiment of the invention.

In this way, a first layer LAY 1 including the layer to be a part of the structure and, if necessary, the layer to be a part of the support portion is formed (refer to FIG. 2A). Here, in FIG. 2A, MD1 indicates the layer to be a part of the structure in the first layer LAY1, and SP1 indicates the layer to be a part of the support portion in the first layer LAY1.

Next, the forming board 20 descends. The distance of the descent of the forming board 20 is set to the thickness of the second layer to be formed next (the second layer including the layer to be a part of the structure and, if necessary, the layer to be a part of the support portion).

Figure 2B:
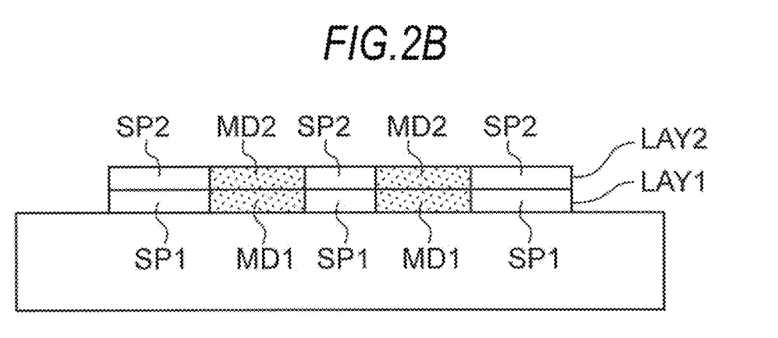
FIG. 2B is a process diagram illustrating one example of a method of preparing a three-dimensional structure according to an exemplary embodiment of the invention.

Next, in the same manner as the first layer LAY1, a second layer LAY2, including the layer to be a part of the structure and, if necessary, the layer to be apart of the support portion, is formed (refer to FIG. 2B). Here, in FIG. 2B, MD2 indicates the layer to be a part of the structure in the second layer LAY2, and SP2 indicates the layer to be a part of the support portion in the second layer LAY2.

In addition, operations for forming the first layer LAY1 and the second layer LAY2 are executed repeatedly to form layers up to the n-th layer LAYn. In this case, a structure in which at least a part thereof is supported by the support portion is formed (refer to FIG. 2C). Here, in FIG. 2C, MDn indicates a layer to be a part of the structure in the n-th layer LAYn. MD indicates the structure. SP indicates the support portion.

Figure 2C:
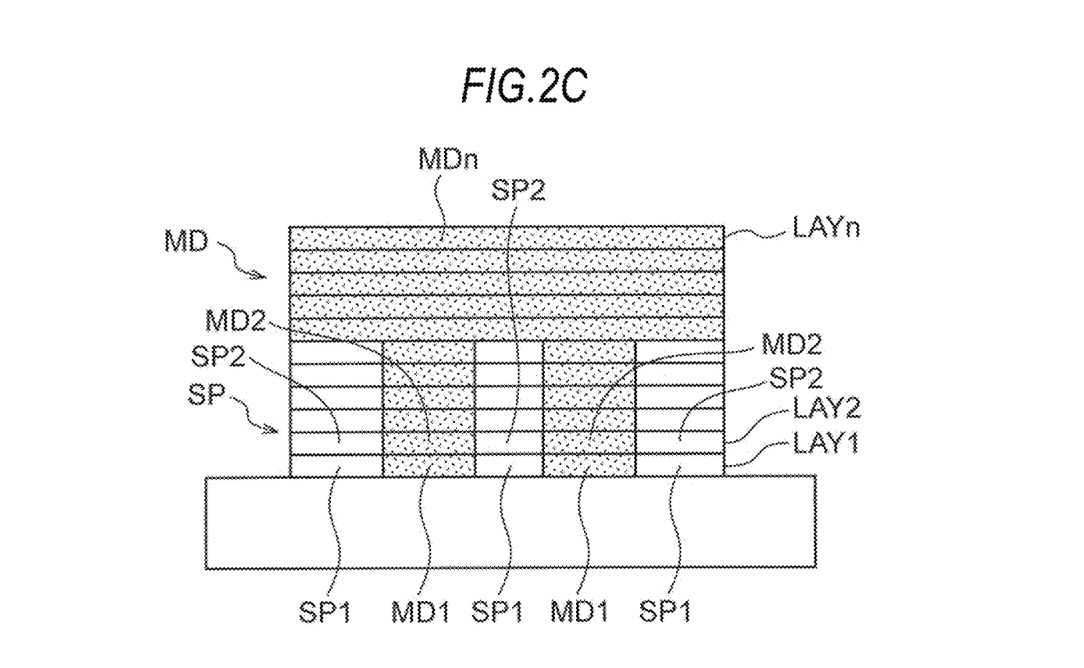
FIG. 2C is a process diagram illustrating one example of a method of preparing a three-dimensional structure according to an exemplary embodiment of the invention.

After that, when the support portion is removed from the structure, a desired structure is obtained. Here, in the exemplary embodiment, the support portion is removed by dissolving it in warm water of from 40° C. to 90° C. (preferably from 60° C. to 90° C., and more preferably from 60° C. to 80° C.).

Specifically, as the method of removing the support portion, for example, a method of removing the support portion by immersing the structure in the state of having the support portion in warm water to dissolve the support portion (immersion method), a method of removing the support portion with water pressure by injecting warm water to the structure in the state of having the support portion to dissolve the support portion (injection method), or the like, is adopted. In addition, in terms of a simple removal method, a removal by an immersion method is more preferable. In the immersion method, even the irradiation of the ultrasonic wave is preferably used in combination.

In addition, the obtained structure may be subjected to post-treatment such as polishing.

EXAMPLES

Hereinafter, the invention will be described in more detail based on Examples, but the invention is not limited to Examples described below. In addition, "parts" refer to "parts by weight" unless otherwise specifically indicated.

Example 1

[Support Material SA1]
—Preparation of Polyglycerin Compound 1—
80 parts of decaglycerin-ester tristearate, 20 parts of diglycerin-ethylene oxide 100 mol adduct are heated and stirred at a range of 100° C. to 200° C. until being melted, and cooled to room temperature (25° C.) to give a polyglycerin compound 1 having an HLB value of 10.
—Preparation of Support Material SA1—
Hydroxyethyl acrylate (HEA): 100 parts
(Warm-Water Soluble UV-curable compound)
Castor oil polyol: 50 parts (Plasticizer, "URIC H-31" manufactured by Ito Seiyu Co., Ltd., hydroxyl value of 157 mgKOH/g to 170 mgKOH/g, viscosity (25° C.) of 40 mPa·s or less)

Polyglycerin compound 1: 50 parts

Polymerization initiator: 5.0 parts ("DAROCUR 1173" manufactured by BASF, 2-hydroxy-2-methyl-1-phenylpropan-1-one)

Polymerization inhibitor: 0.5 parts ("GENORAD 16" manufactured by Rahn AG, Inc.)

The support material SA1 is prepared by mixing the components described above.

Example 2

A support material is obtained in the same manner as in Example 1 except that the polyglycerin compound 1 used in Example 1 is changed to the polyglycerin compound 2 prepared as follows.

—Preparation of Polyglycerin Compound 2—

20 parts of decaglycerin-ester tristearate, 80 parts of the adduct of 100 mol of diglycerin-ethylene oxide are heated and stirred at a range of 100° C. to 200° C. until being melted, and cooled to room temperature (25° C.) to give a polyglycerin compound 2 having an HLB value of 9.5.

Example 3

A support material is obtained in the same manner as in Example 1 except that the hydroxyethyl acrylate (HEA) used in Example 1 is changed to acryloyl morpholine.

Example 4

A support material is obtained in the same manner as in Example 1 except that the plasticizer (castor oil polyol, URIC H-31) used in Example 1 is changed to polyester polyol (P-400, manufactured by ADEKA, Ltd.).

Comparative Example 1

A support material is obtained in the same manner as in Example 1 except that the hydroxyethyl acrylate (HEA), the polymerization initiator (Darocur 1173), and the polymerization inhibitor (Genorad 16) in Example 1 are not contained.

Comparative Example 2

A support material is obtained in the same manner as in Example 1 except that the polyglycerine compound 1 in Example 1 is not contained.

Comparative Example 3

A support material is obtained in the same manner as in Example 3 except that the polyglycerine compound 1 in Example 3 is not contained.

Comparative Example 4

A support material is obtained in the same manner as in Example 4 except that the polyglycerine compound 1 in Example 4 is not contained.

Comparative Example 5

A support material is obtained in the same manner as in Example 1 except that the polyglycerine compound 1 used in Example 1 is changed to an ethylene-vinyl acetate copolymer (manufactured by Moribe Shoten Co., product name: 701D).

[Evaluation]

(Evaluation of Ink Jet Discharge Suitability)

An ink jet discharge suitability of each support material is evaluated by measuring the viscosity.

The viscosity at 70° C. is measured using RHEOMAT 115 (manufactured by Contraves Co.) at a shear rate of 1400 s$^{-1}$.

The evaluation criteria are as follows.

—Evaluation Criteria—

A: 15 mPa·s or less

B: greater than 15 mPa·s and 30 mPa·s or less

C: greater than 30 mPa·s (Evaluation of Shape Accuracy (Resolution))

Figure 3:
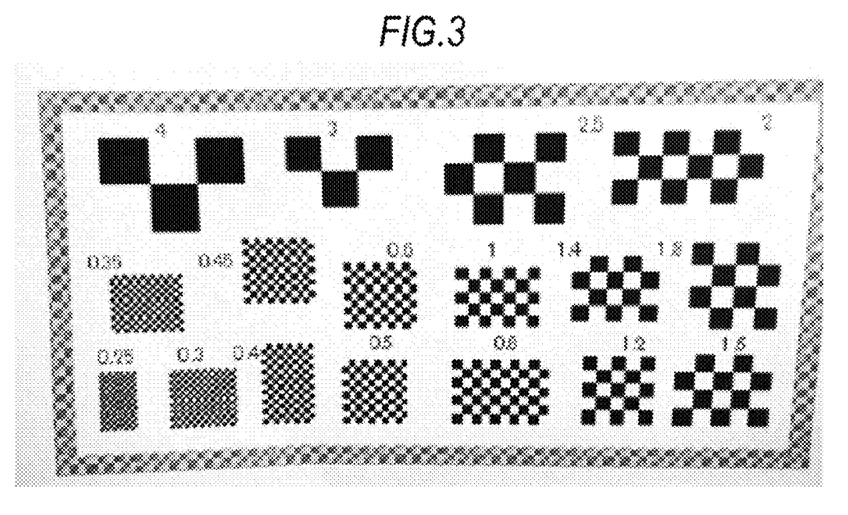
FIG. 3 is a diagram illustrating a resolution pattern having a formed pattern in which convex shapes of the square are arranged in a grid for scanning by a forming device according to an example of the invention.

A resolution pattern having a formed pattern in which square convex shapes (height of the convex portion: 0.5 mm) of 4 mm, 3 mm, 2.5 mm, 2 mm, 1.8 mm, 1.5 mm, 1.4 mm, 1.2 mm, 1.0 mm, 0.8 mm, 0.6 mm, 0.5 mm, 0.45 mm, 0.4 mm, 0.35 mm, 0.3 mm, or 0.25 mm are disposed in a grid pattern (see FIG. 3).

Polaris head (model number: PQ512/85) manufactured by FUJIFILM Dimatix, Inc. as an ink jet head, and SUBZERO-055 (intensity of 100 w/cm) manufactured by Integration Technology Ltd. as an ultraviolet irradiation light source are selected. These are installed in a forming apparatus consisting of a driving unit and a control unit, and this apparatus is used as a forming apparatus for testing. Further, the forming device is set as a device in which both the ink jet head and the light source reciprocally move, lamination of a support material layer having a thickness of 20 μm and curing process by ultraviolet irradiation are performed every scan, and formation of support portion by the support material is performed. In addition, the forming apparatus is configured such that the support material is fed from the storage tank to the ink jet head after removing foreign substances bypassing through Profile Star A050 filter (pore diameter: 5 μm), manufactured by Nippon Pole Ltd., via a TYGON 2375 chemical-resistant tube, manufactured by Saint-Gobain Co., by a feed pump, under a light-shielding condition.

A support portion pattern is formed using the forming apparatus by scanning the resolution pattern, and it is evaluated based on the size of the formed pattern that could be resolved.

(Evaluation of Warm Water Removal Property)

The support portion pattern formed in the evaluation of the shape accuracy (resolution) is immersed in warm water of 60° C., and it is evaluated based on whether or not the pattern is dissolved.

—Evaluation Criteria—

A: the pattern is dissolved within 5 minutes so that the solid is disappeared

B: the pattern is dissolved, but it takes more than 30 minutes until the solid is disappeared C: not all the pattern is dissolved, and the solid remains

TABLE 1

| | Examples | | | | Comparative Examples | | | | |
|---|---|---|---|---|---|---|---|---|---|
| | 1 | 2 | 3 | 4 | 1 | 2 | 3 | 4 | 5 |
| Ink Jet Discharge Suitability | A | A | A | B | B | A | A | A | A |
| Shape Accuracy (Resolution) | 0.35 mm | 0.4 mm | 0.35 mm | 0.3 mm | 0.8 mm | 1.5 mm | 1.5 mm | 1 mm | 0.4 mm |
| Warm Water Removal Property | A | A | A | A | B | B | A | B | C |

From the results in Table 1, it is understood that each of Examples using a support material containing a warm water-soluble radiation curable compound and a specific polyglycerin compound has excellent shape accuracy of the support portion to be formed, as compared to Comparative Examples 2, 3 and 4 containing no polyglycerin compound.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimension forming support material for ink jet, comprising:
    a warm water-soluble radiation curable compound that exhibits solubility in warm water of at least 40° C. to 90° C. after the compound is cured; and
    at least one polyglycerin compound selected from the group consisting of fatty acid esters of polyglycerin, ethylene oxide adducts of polyglycerin, and propylene oxide adducts of polyglycerin,
    wherein a content of the polyglycerin compound is from 10 to 35 wt % with respect to a total amount of the three-dimension forming support material.

2. The three-dimension forming support material for ink jet according to claim 1, wherein a viscosity at 23° C. of the warm water-soluble radiation curable compound is from 5 mPa·s to 80 mPa·s.

3. The three-dimension forming support material for ink jet according to claim 1, wherein a content of the warm water-soluble radiation curable compound is from 40% by weight to 80% by weight with respect to a total amount of the three-dimension forming support material.

4. The three-dimension forming support material for ink jet according to claim 1, wherein the polyglycerin compound is a polymer composed of 2 molecules to 20 molecules of glycerin.

5. The three-dimension forming support material for ink jet according to claim 1, wherein a hydrophile lipophile balance (HLB) value of the at least one polyglycerin compound is from 7 to 13.

6. The three-dimension forming support material for ink jet according to claim 1, wherein the polyglycerin compound is solid at 23° C.

7. The three-dimension forming support material for ink jet according to claim 1, wherein a melting temperature of the polyglycerin compound is from 40° C. to 70° C.

8. The three-dimension forming support material according to claim 1, further comprising a plasticizer.

9. The three-dimension forming support material according to claim 8, wherein the plasticizer includes at least one selected from the group consisting of polyether polyol, castor oil polyol, and polyester polyol.

10. The three-dimension forming support material according to claim 9, wherein a hydroxyl value of the castor oil polyol is from 100 mgKOH/g to 300 mgKOH/g.

11. The three-dimension forming support material according to claim 8, wherein a content of the plasticizer is 25% by weight to 60% by weight with respect to a total amount of the three-dimension forming support material.

12. The three-dimension forming support material according to claim 1, wherein the warm water-soluble radiation curable compound includes at least one selected from the group consisting of hydroxyethyl (meth)acrylate, (meth)acrylamide, (meth)acryloyl morpholine, acrylic acid, methoxy triethylene glycol acrylate, and methoxy polyethylene glycol acrylate.

13. The three-dimension forming support material according to claim 12, wherein the warm water-soluble radiation curable compound includes hydroxyethyl (meth)acrylate.

14. The three-dimension forming support material according to claim 1, further comprising a non-radiation curable component.

15. The three-dimension forming support material according to claim 14, wherein a weight average molecular weight of the non-radiation curable component is from 200 to 1,000.

16. The three-dimension forming support material according to claim 14, wherein a viscosity at 25° C. of the non-radiation curable component is 200 mPa·s or less.

17. The three-dimension forming support material according to claim 14, wherein the non-radiation curable component is composed of a fatty acid ester having carbon atoms of 16 to 20.

18. A three-dimension forming support material cartridge accommodating the three-dimension forming support material according to claim 1.

19. A three-dimension forming composition set comprising a radiation curable three-dimension forming material and the three-dimension forming support material according to claim 1.

* * * * *